United States Patent [19]
Boissier et al.

[11] 3,737,173
[45] June 5, 1973

[54] TORSION BAR SUSPENSION SYSTEM

[76] Inventors: Lucien Albert Boissier, 36 rue Saint-Exupery; Jean Joseph Barge, 89 rue Claude Bochard, both of Roanne, France

[22] Filed: Oct. 6, 1971

[21] Appl. No.: 187,004

[30] Foreign Application Priority Data
Oct. 6, 1970    France..............................7036037

[52] U.S. Cl..........................280/104.5 R, 280/124 B
[51] Int. Cl.................................................B60g 19/02
[58] Field of Search.....................280/104.5 R, 124 B

[56]          References Cited
         UNITED STATES PATENTS
3,582,105    6/1971    Reynolds..........................280/104.5

FOREIGN PATENTS OR APPLICATIONS
B3,458,411    2/1955    Germany......................280/104.5 R

*Primary Examiner*—Philip Goodman
*Attorney*—Stevens, Davis, Miller & Mosher

[57]         ABSTRACT

A torsion bar suspension system for vehicles, especially those used for transporting delicate cargo or cargo over rough surfaces. The four independently suspended wheels are mounted on lever arms and torsion bars. The two torsion bars on each side are connected to a deformable parallelogram so that upward movement of one wheel will exert a downward force on the other.

3 Claims, 5 Drawing Figures

PATENTED JUN 5 1973 3,737,173

TORSION BAR SUSPENSION SYSTEM

The present invention is directed to an improved type of vehicle suspension system, more particularly a torsion bar suspension system for a four wheeled vehicle in which the torsion bars on the same side of the vehicle are interconnected by a deformable parallelogram.

There are many types of quite satisfactory suspension systems for vehicles which move on relatively smooth highways but, as is well known, most present day vehicles are not well suited for off-the-highway use. The chief difficulty is the suspension system which cannot cope with the sharp differences in ground level which are often incurred such as passing over bumps or ditches without incurring damage to the suspension system or vehicle itself.

The suspension system of the present invention overcomes these problems by forcing the wheels to keep in close contact with the ground, thus improving the traction contact therewith and, at the same time, causing the vehicle to ride much more evenly. Since the present suspension system easily follows irregular contours and absorbs differences in level, the vehicle body can more readily follow a horizontal path.

Other objects and advantages of this invention will be more clearly understood from the attached drawings, which are given by way of example and not limitation, in which.

In the prior art, a torsion bar had one end attached directly to the chassis or frame of the vehicle, the other end of the torsion bar being connected to the wheel it suspended through the intermediary of a lever arm. Up and down motion of the wheel would cause pivotal movement of the associated lever arm, thus causing a torsional or twisting motion to the torsion bar itself.

Figure 1:
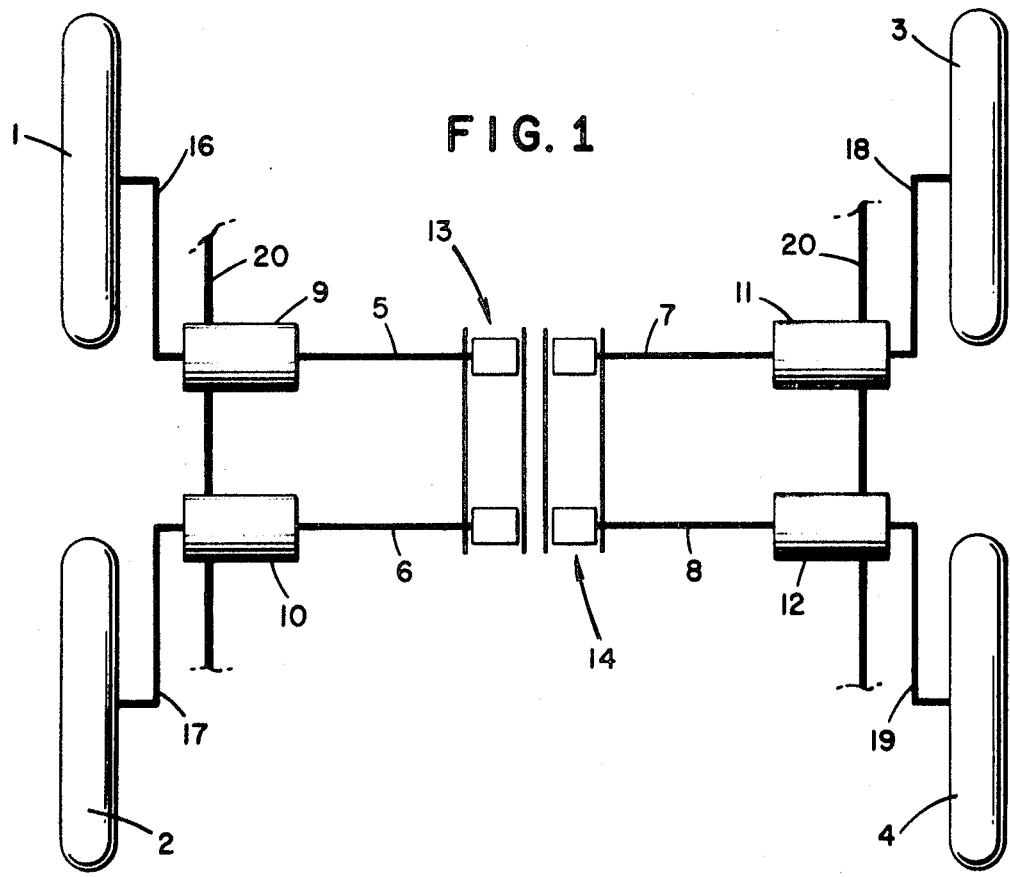
FIG. 1 is a diagrammatic top plan view of the torsion bar suspension system of this invention.

Turning now to FIG. 1, a top plan diagrammatic view of the present invention, it can be seen that four independent wheels 1, 2, 3 and 4 are connected to their respective torsion bars 5, 6, 7 and 8 through the intermediary of their respective lever arms 16, 17, 18 and 19. However, the other ends of the torsion bars 5–8 are not connected directly to the chassis 20 of the vehicle but, instead, are pivotally supported in and pass through bearings 9, 10, 11 and 12 which are supported by the chassis 20. As a result, they are not fixed with respect to the chassis with respect to their rotation. After passing through bearings 9 and 10, torsion bars 5 and 6 are connected to a deformable parallelogram, generally indicated by reference numeral 13. Torsion bars 7 and 8 are similarly connected to a deformable parallelogram 14.

Figure 2:
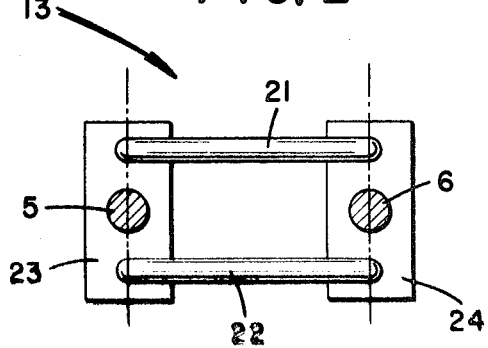
FIG. 2 is a side view of one of the parallelograms of the present invention when the vehicle is on level ground.

In FIG. 2, parallelogram 13 has been illustrated in greater detail, it being understood that the construction of parallelogram 14 is similar. In FIG. 2 it can be seen that torsion bars 5 and 6 are rigidly secured in blocks 23 and 24. These blocks are interconnected by tie rods 21 and 22. The tie rods are moveably mounted in the blocks 23 and 24 but since the tie rods are of a fixed length, they will always maintain blocks 23 and 24 in parallel relationship.

Figure 3:
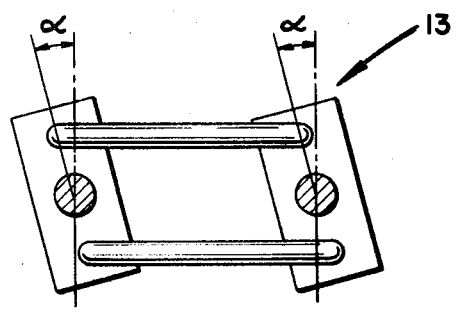
FIG. 3 is a view similar to FIG. 2 when the vehicle is on uneven ground.
Figure 4:
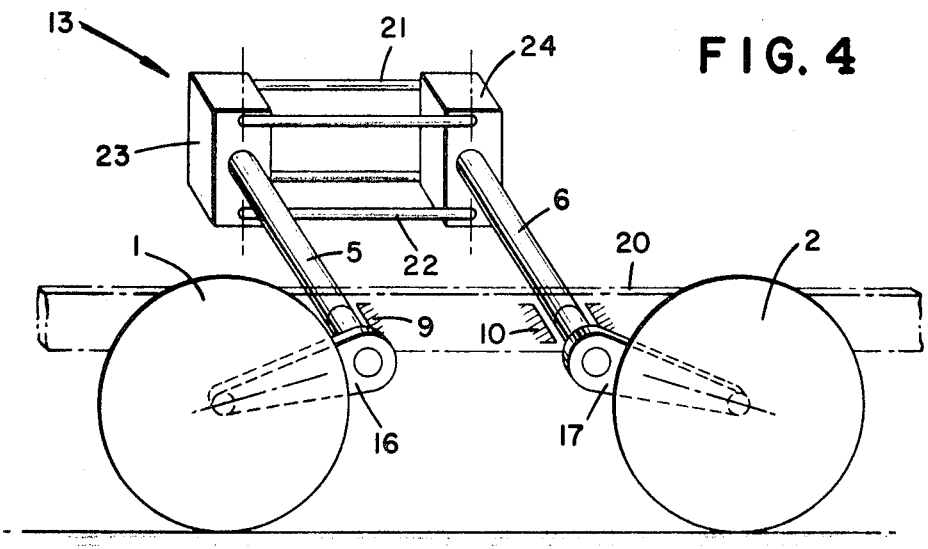
FIG. 4 is a diagrammatic perspective view of two wheels on the same side of the vehicle utilizing the parallelogram of the present invention.
Figure 5:
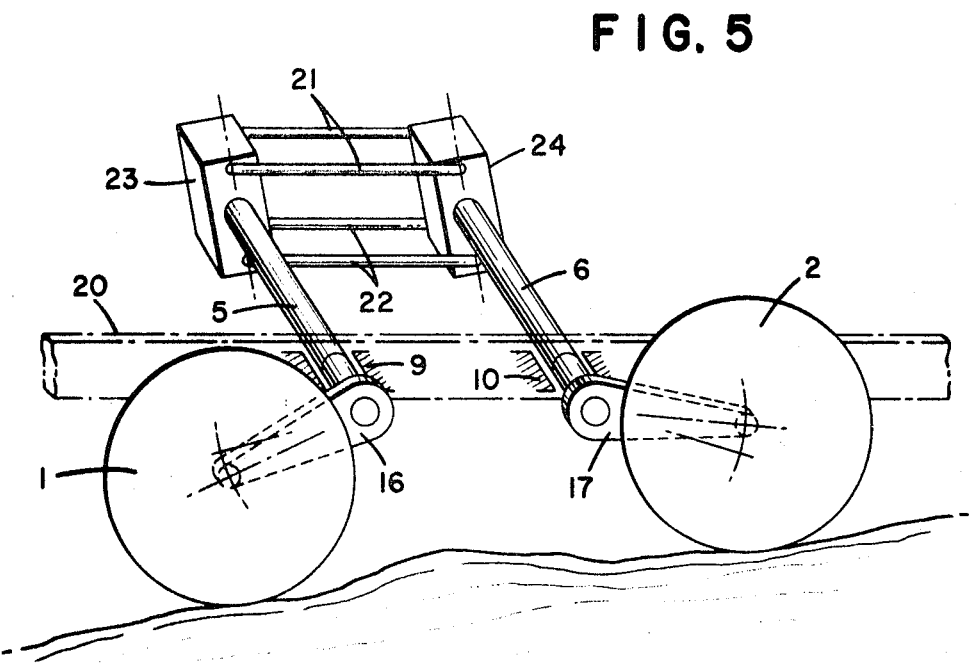
FIG. 5 is a diagrammatic perspective view similar to FIG. 4 with the wheels on uneven ground.

Turning now to FIG. 5, the effect of the present suspension system can be seen since as wheel 2 passes over an obstruction it causes torsion bar 6 to flex and twist inducing a counterclockwise movement in block 24. Due to tie rods 21 and 22, this causes a similar counterclockwise motion in block 23, the angular travel on each block about its torsion bar pivot point being the same angle $\alpha$ as shown in FIG. 3. Since lever arm 16 faces in the opposite sense from lever arm 17, arm 16 will then tend to be forced downwardly correspondingly to the upward movement of arm 17. If wheel 2 encounters an obstacle and rises, then wheel 1 drops to an extent which is dependent chiefly upon the elasticity of the torsion bars. Since the wheels are kept in close contact with the ground, any jump or skipping of the vehicle is prevented.

The present suspension system is especially useful where the contents of a vehicle are very fragile, particularly if being transported over uneven ground. It can be used on a wide variety of vehicles or machines, particularly on caterpillar tractor vehicles. It is well suited for shipping of extremely delicate cargo such as explosives whether in the vehicle itself or in a towed vehicle.

What is claimed is:

1. A torsion bar suspension system comprising a plurality of wheel means, a plurality of torsion bars each supporting a lever and wheel means at one end and being secured to a block at the other end, bearing means rotatably supporting each of said torsion bars at said one end, the other end of each of said torsion bars being unsupported, and means interconnecting the blocks associated with the wheels on one side of a vehicle to constitute a deformable parallelogram, said levers being mounted in opposite senses so that a movement in one wheel means tends to cause an opposite movement in the other wheel means on the same side of the vehicle.

2. The system of claim 1 including a vehicle chassis supporting said system with bearing means for said torsion bars being secured to said chassis.

3. The system of claim 1 in which said interconnecting means is a pair of tie rods pivotally connected to each of said blocks.

\* \* \* \* \*